US011321572B2

United States Patent
Sano et al.

(10) Patent No.: US 11,321,572 B2
(45) Date of Patent: May 3, 2022

(54) SELF-POSITION ESTIMATION METHOD AND SELF-POSITION ESTIMATION DEVICE

(71) Applicant: Nissan Motor Co., Ltd., Yokohama (JP)

(72) Inventors: Yasuhito Sano, Kanagawa (JP); Chikao Tsuchiya, Kanagawa (JP); Takuya Nanri, Kanagawa (JP); Hiroyuki Takano, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 115 days.

(21) Appl. No.: 16/336,366

(22) PCT Filed: Sep. 27, 2016

(86) PCT No.: PCT/JP2016/078428
§ 371 (c)(1),
(2) Date: Mar. 25, 2019

(87) PCT Pub. No.: WO2018/061084
PCT Pub. Date: Apr. 5, 2018

(65) Prior Publication Data
US 2020/0019792 A1   Jan. 16, 2020

(51) Int. Cl.
*G06K 9/00* (2006.01)
*G06T 7/73* (2017.01)
(Continued)

(52) U.S. Cl.
CPC .......... *G06K 9/00798* (2013.01); *G06T 7/246* (2017.01); *G06T 7/73* (2017.01);
(Continued)

(58) Field of Classification Search
CPC ...... G05D 1/0088; G05D 1/02; G05D 1/0246; G05D 1/0278; G05D 1/0212;
(Continued)

(56) References Cited

U.S. PATENT DOCUMENTS

2002/0065603 A1* 5/2002 Watanabe .............. G01C 21/30
701/446
2009/0118994 A1* 5/2009 Mori .................. G06K 9/00798
701/117
(Continued)

FOREIGN PATENT DOCUMENTS

CN   105793669 A   7/2016
JP   H6-333192 A   12/1994
(Continued)

OTHER PUBLICATIONS

P. Hansen, H. Alismail, P. Rander and B. Browning, "Monocular visual odometry for robot localization in LNG pipes," 2011 IEEE International Conference on Robotics and Automation, 2011, pp. 3111-3116 (Year: 2011).*

(Continued)

*Primary Examiner* — Michael J Vanchy, Jr.
(74) *Attorney, Agent, or Firm* — Young Basile Hanlon & MacFarlane, P.C.

(57) ABSTRACT

A self-position estimation method includes: detecting a relative position between a target present in surroundings of a moving object and the moving object; storing a position where the relative position is moved by the moved amount of the moving object, as target position data; selecting the target position data on the basis of reliability of the relative position of the target position data with respect to the moving object; and comparing the selected target position data with map information including the position information on the target present on a road or around the road, thereby estimating a self-position which is a current position of the moving object.

8 Claims, 9 Drawing Sheets

(51) Int. Cl.
G06T 7/246 (2017.01)
G05D 1/00 (2006.01)
G05D 1/02 (2020.01)

(52) U.S. Cl.
CPC ......... *G05D 1/0088* (2013.01); *G05D 1/0246* (2013.01); *G06K 2209/21* (2013.01); *G06T 2207/30256* (2013.01)

(58) Field of Classification Search
CPC .... G05D 1/0219; G05D 1/0221; G05D 1/024; G05D 1/0251; G05D 1/0253; G05D 1/0261; G05D 1/0272; G05D 1/0274; G05D 1/0287; G05D 2201/0207; G05D 2201/0213; G05D 1/0234; G05D 2201/0216; G06K 2209/21; G06K 9/00798; G06K 9/00791; G06K 9/00818; G06K 9/00825; G06K 9/3258; G06K 19/06037; G06K 19/07758; G06T 2207/30244; G06T 2207/30256; G06T 7/246; G06T 7/70; G06T 7/73; G06T 2207/20081; G06T 2207/30261; G06T 7/00; G01C 21/30; G01C 21/20; G01C 21/32; G01C 21/14; G01C 21/165; G01C 21/34; G01C 21/3407; G01C 21/3476; G01C 21/36; G01C 21/3602; G01C 21/3623; G01C 21/3644; G01C 21/3658; G01C 21/3691; G01C 21/3811; G01C 21/3822; B60W 2420/42; B60W 2554/20; B60W 2554/40; B60W 2554/60; B60W 2555/60; B60W 2710/18; B60W 2710/20; B60W 2720/10; B60W 30/10; B60W 30/14; B60W 30/18; B60W 40/06; B60W 60/0015; B60W 2050/0215; B60W 2552/05; B60W 2555/20; B60W 2556/50; B60W 30/12; B60W 50/14; B62D 15/025; G01S 13/89; G01S 17/89; G01S 19/10; G01S 13/06; G01S 13/867; G01S 19/48; G01S 19/49; G06F 16/2379; G06F 16/29; G08G 1/0112; G08G 1/09623; G08G 1/096725; G08G 1/096805; G08G 1/167; H04L 67/12; B66F 9/063; B66F 9/0755; G06Q 10/087

See application file for complete search history.

(56) References Cited

U.S. PATENT DOCUMENTS

| | | | |
|---|---|---|---|
| 2010/0217524 A1* | 8/2010 | Oohashi | G01S 19/49 701/472 |
| 2010/0231718 A1* | 9/2010 | Nakamori | G06K 9/00798 348/148 |
| 2011/0208745 A1* | 8/2011 | Dietsch | G01C 21/20 707/743 |
| 2012/0154588 A1* | 6/2012 | Kim | G06K 9/4633 348/148 |
| 2012/0239239 A1 | 9/2012 | Suyama | |
| 2015/0278613 A1 | 10/2015 | Takemae et al. | |
| 2015/0378015 A1* | 12/2015 | You | G01S 19/48 701/469 |
| 2016/0121889 A1* | 5/2016 | Shimomura | B60W 50/14 701/41 |
| 2016/0161265 A1* | 6/2016 | Bagheri | G01C 21/32 701/450 |
| 2016/0305794 A1 | 10/2016 | Horita et al. | |
| 2017/0008521 A1* | 1/2017 | Braunstein | G08G 1/096725 |
| 2017/0314956 A1 | 11/2017 | Shiina et al. | |
| 2018/0089616 A1* | 3/2018 | Jacobus | G05D 1/0274 |

FOREIGN PATENT DOCUMENTS

| | | | |
|---|---|---|---|
| JP | 2008040677 A | | 2/2008 |
| JP | 2008250906 A | | 10/2008 |
| JP | 2009020014 A | * | 1/2009 |
| JP | 2012194860 A | | 10/2012 |
| JP | 2015191372 A | | 11/2015 |
| JP | 201691045 A | | 5/2016 |
| WO | 2015083538 A1 | | 6/2015 |
| WO | 2016093028 A1 | | 6/2016 |

OTHER PUBLICATIONS

L. Wei, C. Cappelle and Y. Ruichek, "Unscented information filter based multi-sensor data fusion using stereo camera, laser range finder and GPS receiver for vehicle localization," 2011 14th International IEEE Conference on Intelligent Transportation Systems ( ITSC), 2011, pp. 1923-1928 (Year: 2011).*

Q. Lv, W. Zhou and J. Liu, "Realization of Odometry System Using Monocular Vision," 2006 International Conference on Computational Intelligence and Security, 2006, pp. 1841-1844 (Year: 2006).*

* cited by examiner

SELF-POSITION ESTIMATION METHOD AND SELF-POSITION ESTIMATION DEVICE

TECHNICAL FIELD

The present invention relates to a self-position estimation method and a self-position estimation device.

BACKGROUND

There has been known a technology of estimating a self-position of an autonomous mobile robot (refer to Japanese Patent Application Laid-Open Publication No. 2008-250906). In Japanese Patent Application Laid-Open Publication No. 2008-250906, a result (surrounding environment information) of having detected a movable region of a mobile robot by means of a sensor is restricted in a region which is predetermined on the basis of the mobile robot, and this restricted surrounding environment information is compared with an environmental map previously stored in the mobile robot, thereby estimating a self-position thereof.

By the way, in order to estimate a self-position of a vehicle, there are cases of using white lines positioned on both sides of the vehicle in a vehicle width direction. Generally, when both white lines are simultaneously detected, an error may be included in the detected position of the white lines. In particular, the position of the white lines in the vehicle width direction with respect to the vehicle is steadily offset due to a calibration error or the like. For this reason, an estimation result of the self-position becomes unstable, or an estimation accuracy of the self-position is reduced.

SUMMARY

The present invention has been made in light of the above-mentioned problem, and the object of the present invention is to provide a self-position estimation method and a self-position estimation device for improving an estimation accuracy of the self-position by eliminating the target position data estimated to have many errors of a relative position.

The self-position estimation method according to one aspect of the present invention including: detecting a relative position between a target present in surroundings of a moving object and the moving object; storing a position where the detected relative position is moved by a moved amount of the moving object, as target position data; selecting target position data to be compared with map information from the stored target position data on the basis of reliability of the relative position with respect to the moving object of the target position data; and comparing the selected target position data with the map information including the position information on the target present on a road or around the road, thereby estimating a self-position which is a current position of the moving object.

According to the self-position estimation method according to one aspect of the present invention, since the target position data estimated to have many errors of the relative position can be eliminated, the estimation accuracy of the self-position can be improved.

DETAILED DESCRIPTION

Figure 1:
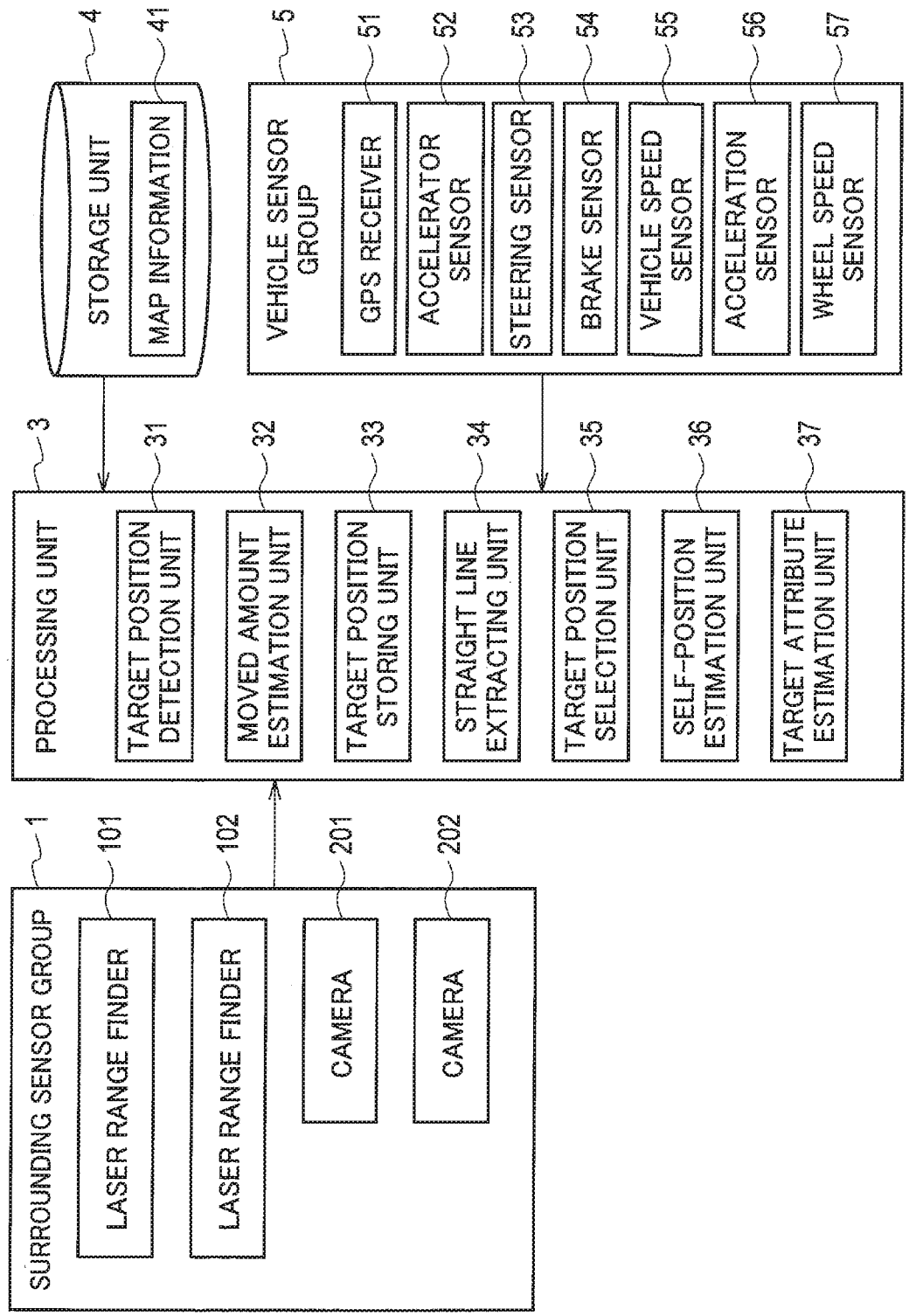
FIG. 1 is a block diagram showing an example of a configuration of a self-position estimation device according to an embodiment.

An embodiment will now be explained with reference to the drawings. In the description of the drawings, the identical or similar reference numeral is attached to the identical or similar part, and an explanation thereof is omitted.

With reference to FIG. 1, a configuration of a self-position estimation device according to the present embodiment will now be explained. The self-position estimation device according to the present embodiment includes a surrounding sensor group 1, a processing unit 3, a storage unit 4, and a vehicle sensor group 5. The self-position estimation device according to the present embodiment is mounted in a vehicle V (refer to FIG. 2), and is configured to estimate a self-position of the vehicle V.

In the present embodiment, it is configured to estimate three degrees of freedom in total including positions and attitude angle (i.e., a position in the east-west direction (X axial direction) (X coordinate [m]) and a position in the north-south direction (Y axial direction) (Y coordinate [m]) as the self-position of the vehicle V to be estimated, and an azimuth angle θ of the vehicle (yaw angle [rad]) as the attitude angle data of the vehicle V to be estimated) on the two-dimensional plane.

The surrounding sensor group 1 includes a plurality of Laser Range Finders (LRFs) 101 and 102 and a plurality of cameras 201 and 202, for example. The Laser Range Finders (LRFs) 101 and 102 are respectively configured to detect a distance and azimuth to a target by receiving light reflected from the target to which laser light is emitted. The cameras 201 and 202 are configured to capture surroundings of the vehicle V, and obtain the digital image capable of image processing. Thus, the surrounding sensor group 1 is composed of a plurality of sensors respectively configured to detect targets present in surroundings of the vehicle V. In addition to the plurality of sensors, the surrounding sensor group 1 may include sonar and/or radar. The targets which are present in the surroundings of the vehicle V include: targets indicating traveling lane boundaries present on a traveling lane in the surroundings of the vehicle V, e.g. white lines, curbs, median strips, the guardrails, and reflectors; road surface markings, e.g. stop lines, pedestrian crossings, and speed limit markings; and road structures, e.g. road signs, traffic lights, and the utility-line pole.

Figure 2:
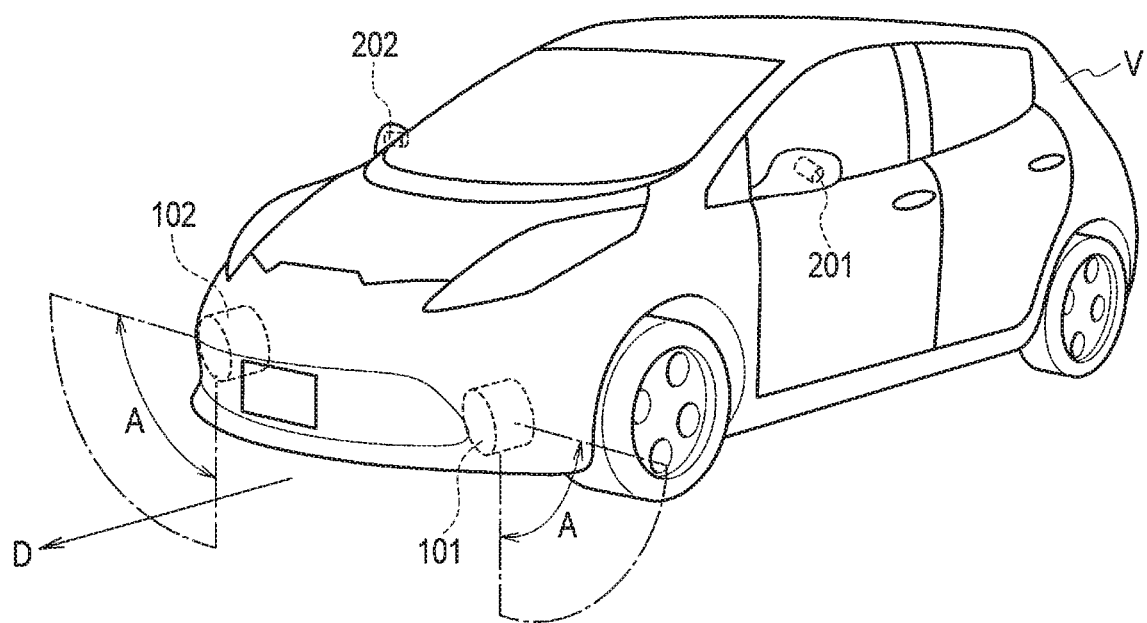
FIG. 2 is a perspective diagram showing a state where a surrounding sensor group 1 is mounted in a vehicle V.

FIG. 2 shows an example illustrating a state where the surrounding sensor group 1 is mounted in the vehicle V. The LRFs 101 and 102 can be respectively mounted near front fenders of both sides of the vehicle V, for example. The LRFs 101 and 102 are configured to scan laser light at a predetermined scan angle (e.g., 90 degrees) so that a track of the laser light to be emitted may, for example, form a vertical plane with respect to a road surface as a rotation axis along a front-back direction D of the vehicle V. Consequently, the LRFs 101 and 102 can detect targets, such as curbs or the like, which are present in a right-left direction of the vehicle V. The LRFs 101 and 102 are configured to sequentially output a shape of the detected target to the processing unit 3 as a detection result.

The cameras 201 and 202 can be respectively mounted in door mirrors of both sides of the vehicle V, for example. The cameras 201 and 202 are configured to capture an image by means of solid state imaging elements, e.g. a Charge-Coupled Device (CCD) and a Complementary Metal-Oxide Semiconductor (CMOS), for example. The cameras 201 and 202 are configured to capture a road surface of a lateral direction of the vehicle V, for example. The cameras 201 and 202 are configured to sequentially output the captured image to the processing unit 3.

Returning to FIG. 1, the storage unit 4 is a map information storage unit configured to store map information 41 including position information on targets present on a road or around the road. The storage unit 4 can be composed by including a semiconductor memory, a magnetic disk, or the like. The targets (landmark) recorded in the map information 41 includes, for example, various facilities which can be detected by the surrounding sensor group 1 in addition to: the road markings indicating stop lines, pedestrian crossings, advance notices of pedestrian crossing, section lines, and the like; structures, e.g. curbs, and the like, etc. Also regarding a target actually having a three-dimensional structure such as curbs, the map information 41 is described with only position information on a two-dimensional plane. In the map information 41, the position information, e.g. curbs and white lines, is defined by the aggregate of linear information having two-dimensional position information on both end points. The map information 41 is described as linear information on a two-dimensional plane approximated with a polygonal line, when a shape of real environment is a curve.

The vehicle sensor group 5 includes a GPS receiver 51, an accelerator sensor 52, a steering sensor 53, a brake sensor 54, a vehicle speed sensor 55, an acceleration sensor 56, a wheel speed sensor 57, and other sensors, such as a yaw rate sensor. Each sensor 51 to 57 is connected to the processing unit 3 and is configured to sequentially output various detection results to the processing unit 3. The processing unit 3 can calculate a position of the vehicle V in the map information 41 or can calculate the odometry indicating a moved amount of the vehicle V in a unit time, by using each detection result of the vehicle sensor group 5. For example, as a measuring method of the moved amount of the vehicle V, there can be considered various schemes, e.g. an odometry measurement method at the rotational frequency of a tire, an inertia measurement method using a gyroscope or an acceleration sensor, a method by receiving electric waves from satellites, e.g. a Global Navigation Satellite System (GNSS), and Simultaneous Localization and Mapping (SLAM) for estimating an moved amount from change of a measurement value of external sensors; but it may be used any method.

The processing unit 3 includes: a target position detection unit 31, a moved amount estimation unit 32, a target position storing unit 33, a straight line extracting unit 34, a target position selection unit 35, a self-position estimation unit 36, and a target attribute estimation unit 37. The processing unit 3 can be composed by including a microcontroller which is an integrated circuit provided with a Central Processing Unit (CPU), a memory, an input/output interface (I/F), and the like, for example. In this case, a plurality of information processing units (31 to 37) constituting the processing unit 3 are realized by the CPU executing a computer program preinstalled in the microcontroller. Each unit constituting the processing unit 3 may be composed by including integrated hardware or may be composed by including discrete hardware. The microcontroller may also be used as an Electronic Control Unit (ECU) used for other control in regard of the vehicle V, e.g. automatic driving control, for example. A "self-position estimation circuit" is provided therein by including the moved amount estimation unit 32, the target position storing unit 33, the straight line extracting unit 34, the target position selection unit 35, the self-position estimation unit 36, and the target attribute estimation unit 37.

The target position detection unit 31 detects a relative position between a target present in the surroundings of the vehicle V and the vehicle V on the basis of a detection result of at least any one of the LRFs 101 and 102 and the cameras 201 and 202. The relative position detected by the target position detection unit 31 is a position in a vehicle coordinate system. The vehicle coordinate system may adopt the center of a rear wheel axle of the vehicle V as an origin point, a forward direction of the vehicle V as a positive direction of the x-axis, a leftward direction of the vehicle V as a positive direction of the y-axis, and an upward direction as a positive direction of the z-axis. Moreover, a conversion formula from the coordinate system (sensor coordinate system) of the LRFs 101 and 102 and the cameras 201 and 202 to the vehicle coordinate system is previously set in the target position detection unit 31. A "target detection sensor" is provided therein by including the vehicle sensor group 5 and the target position detection unit 31.

The moved amount estimation unit 32 detects an odometry which is a moved amount of the vehicle V in a unit time on the basis of detection result information of at least any one of the sensors includes in the vehicle sensor group 5. The moved amount of the vehicle V is detected as a moved amount in the odometry coordinate system. The target position storing unit 33 stores a position where the relative position of the target detected by the target position detection unit 31 is moved by the moved amount of the vehicle V detected by the moved amount estimation unit 32, as target position data, in a primary storage unit or the storage unit 4 in the processing unit 3.

The straight line extracting unit 34 extracts linear information from the target position data stored in the target position storing unit 33. The target attribute estimation unit 37 estimates an attribute of the target on the basis of a detection result of at least any one of the LRFs 101 and 102 and the cameras 201 and 202. The target position selection unit 35 selects target position data on the basis of reliability of the relative position with respect to the vehicle of target position data. The target position selection unit 35 determines the reliability of the relative position of the target position data with respect to the vehicle V on the basis of the linear information extracted by the straight line extracting unit 34 and the attribute of the target estimated by the target attribute estimation unit 37. The self-position estimation unit 36 estimates a self-position which is a current position of the vehicle V by comparing the selected target position data with the map information including the position information on the target present on the road or around the road.

Figure 3:
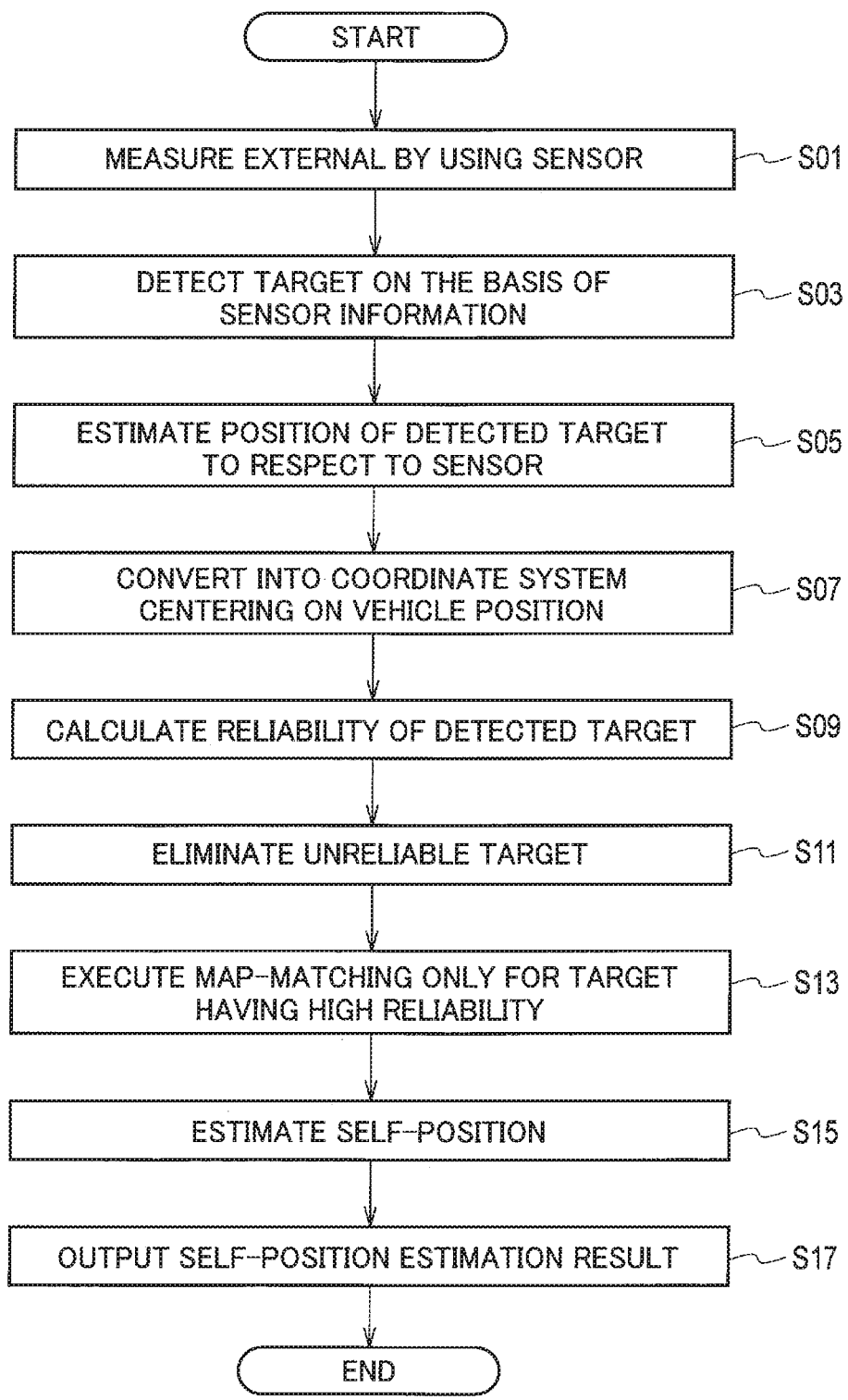
FIG. 3 is a flow chart showing an example of a self-position estimation method using the self-position estimation device shown in FIG. 1.

With reference to FIG. 3, an example of a self-position estimation method using the self-position estimation device shown in FIG. 1 will now be explained. First, in Step S01, the self-position estimation device measures surroundings of the vehicle V using the surrounding sensor group 1.

Proceeding to Step S03, the surrounding sensor group 1 respectively detects targets present in the surroundings of the vehicle V. Proceeding to Step S05, the target position detection unit 31 estimates a position of the target with respect to the LRFs 101 and 102 and the cameras 201 and 202 (i.e., a relative position of the target in the sensor coordinate system) on the basis of the detection result of at least any one of the LRFs 101 and 102 and the cameras 201 and 202. For example, in a case of the cameras 201 and 202, a relationship between the position in an image and the actual distance may be previously measured. Alternatively, it is possible to utilize a motion stereo system. The estimation method is not limited to this method, and other known methods can also be utilized. If another sensor (e.g., sonar, LRF, or radar) capable of obtaining distance information is used, a value to be obtained may be directly utilized.

Figure 4:
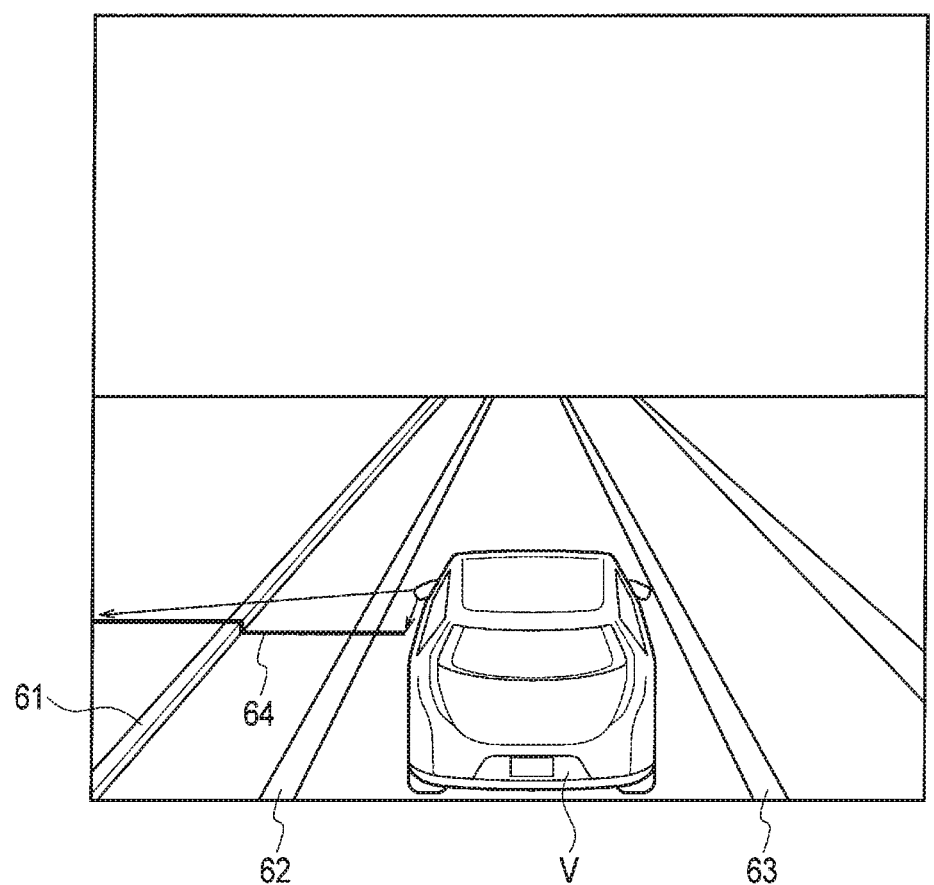
FIG. 4 is a perspective diagram showing an environment in which the vehicle V travels when the self-position estimation is executed.
Figure 5A:
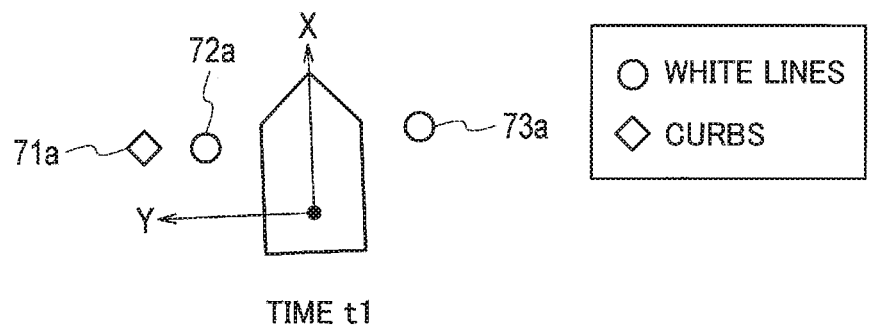
FIGS. 5A to 5D are diagrams respectively showing positions 71 of curbs 61 and target position data 72 and 73 of white lines 62 and 63 in a vehicle coordinate system detected by the target position detector 31 during time t1 to time t4, in the example shown in FIG. 4.
Figure 5B:
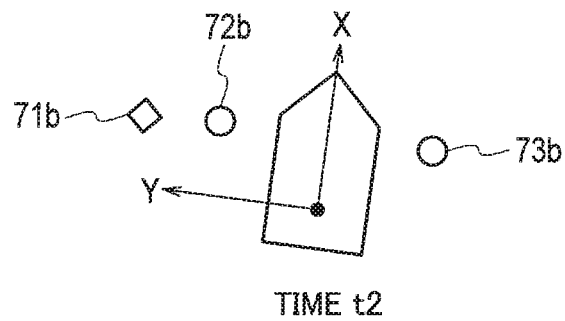
Figure 5C:
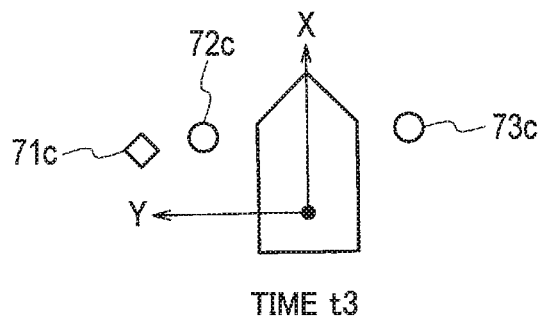
Figure 5D:
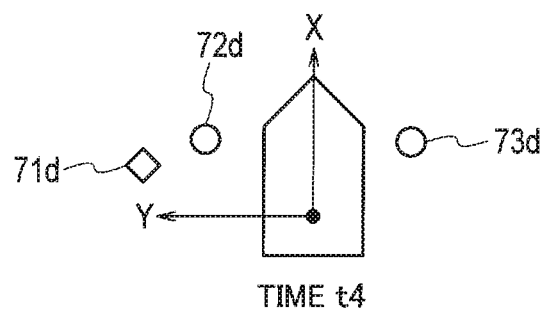

FIG. 4 is an example illustrating an environment in which the vehicle V travels when the self-position estimation is executed. In the example shown in FIG. 4, a road surface including curb 61 is irradiated with laser light emitted from the LRF 101, as shown by the line 64. The target position detection unit 31 extracts a place where change of a shape is large, as a position of the curb 61, on the basis of a direction and a distance of the emitted laser light, and thereby detects a position in the sensor coordinate system. Since it can be assumed that there is always a road surface in a vertical downward direction of the LRFs 101 and 102, the curb 61 can be detected by extracting a point where there is a large change when the road surface is compared with the height thereof.

Moreover, the target position detection unit 31 detects white lines 62 and 63 which are present at both sides of the vehicle V, respectively on the basis of brightness information of the images captured by the cameras 201 and 202. For example, the target position detection unit 31 detects the pattern from which luminance is changed in the order of a dark portion, a bright portion, and a bright portion, on the basis of gray scale image captured by the camera (201, 202), and thereby can detect the center of the bright portion as the white line (62, 63). The positions of the white lines 62 and 63 in the sensor coordinate system can be respectively detected on the basis of a positional relationship between the cameras 201, 202 and the road surface. The position in the sensor coordinate system detected in Step S05 is hereinafter handled as two-dimensional data from which the height information is excluded.

Proceeding to Step S07, the target position detection unit 31 converts the relative position of the target in the sensor coordinate system into a relative position of the target in the vehicle coordinate system using the conversion formula previously set therein.

FIGS. 5A to 5D are diagrams respectively showing positions 71 of curb 61 and target position data 72 and 73 of white lines 62 and 63 in a vehicle coordinate system detected by the target position detector 31 during time t1 to time t4, in the example shown in FIG. 4. Time t1 is the oldest time, and time t4 is the newest time.

Next, in Step S07, the moved amount estimation unit 32 integrates the moved amount of the vehicle V calculated on the basis of the detection result from the vehicle sensor group 5, and thereby calculates a position of the vehicle V in the odometry coordinate system. For the odometry coordinate system, the azimuth angle of the vehicle V may be set to 0 degree, with reference to a position of the vehicle V, as the origin point, at the time when power is supplied to the self-position estimation device or the processing is reset. The integration of the moved amount of the vehicle V is executed in the odometry coordinate system.

Figure 6:
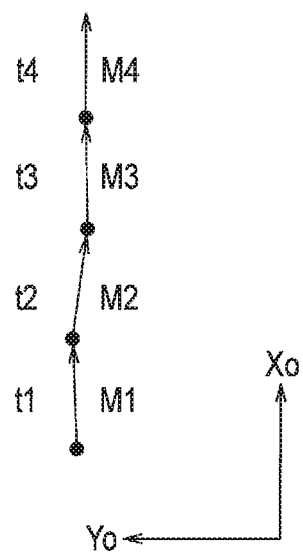
FIG. 6 is a diagram showing a result of integrating a moved amount of the vehicle V calculated on the basis of a detection result by a vehicle sensor group 5, in the example shown in FIGS. 5A to 5D.

FIG. 6 is a diagram showing a result of integrating a moved amount (M1, M2, M3, and M4) of the vehicle V calculated on the basis of a detection result by a vehicle sensor group 5, in the example shown in FIGS. 5A to 5D. The moved amount includes a change in position and attitude ($\theta$: yaw angle) on the two-dimensional coordinate system. In this manner, the moved amount estimation unit 32 calculates a position (Xo, Yo) of the vehicle V in the odometry coordinate system.

In Step S07, the target position storing unit 33 stores a position where the relative position of the target in the vehicle coordinate system detected by the target position detection unit 31 is moved by the moved amount of the vehicle V detected by the moved amount estimation unit 32, as target position data.

Figure 7:
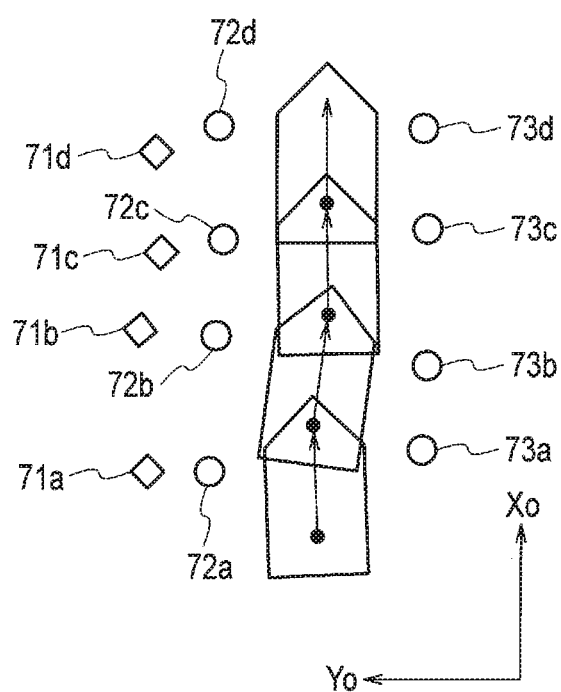
FIG. 7 is a diagram showing target position data converted into an odometry coordinate system, in the example shown in FIGS. 5A-5D and 6.

FIG. 7 is a diagram showing target position data ($71a$ to $71d$, $72a$ to $72d$, and $73a$ to $73d$) converted into an odometry coordinate system, in the example shown in FIGS. 5A-5D and 6. Thus, the target position storing unit 33 converts the position of the target in the sensor coordinate system measured in the past (t1, t2, t3, . . . ) into a position of the target in the odometry coordinate system on the basis of the moved amount (M1, M2, M3, M4) of the vehicle V, and stores the converted position data as target position data therein.

Proceeding to Step S09, the target position selection unit 35 extracts target position data ($71a$ to $71d$, $72a$ to $72d$, and $73a$ to $73d$) indicating traveling lane boundary on the basis of a plurality of stored target position data, and calculates reliability of the relative position with respect to the vehicle V with respect to the extracted target position data ($71a$ to $71d$, $72a$ to $72d$, and $73a$ to $73d$).

Figure 8:
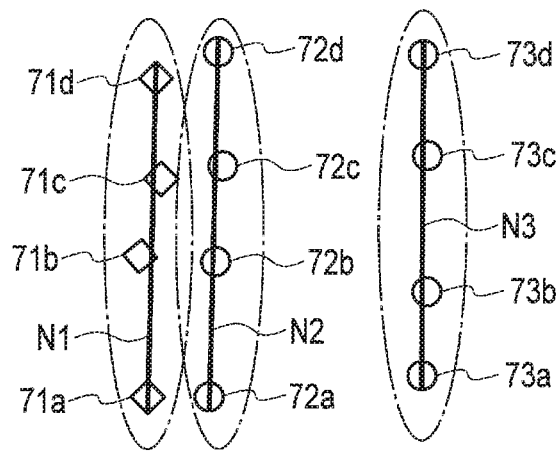
FIG. 8 is a conceptual diagram showing linear information (N1, N2, and N3) extracted from the target position data (71$a$ to 71$d$, 72$a$ to 72$d$, and 73$a$ to 73$d$)

First, as shown in FIG. 8, the straight line extracting unit 34 extracts linear information (N1, N2, and N3) on the basis of the target position data ($71a$ to $71d$, $72a$ to $72d$, and $73a$ to $73d$) stored in the target position storing unit 33. A linear approximation is applied to the detection result of the white line (target position data). Moreover, the target position selection unit 35 determines the reliability of the relative position of the target position data with respect to the vehicle V in accordance with a difference between the distance from the vehicle V to the target obtained on the basis of the relative position of the target and the assumed distance from the vehicle V to the target. The target position selection unit 35 determines that the reliability is higher as the aforementioned difference is smaller.

Figure 9:
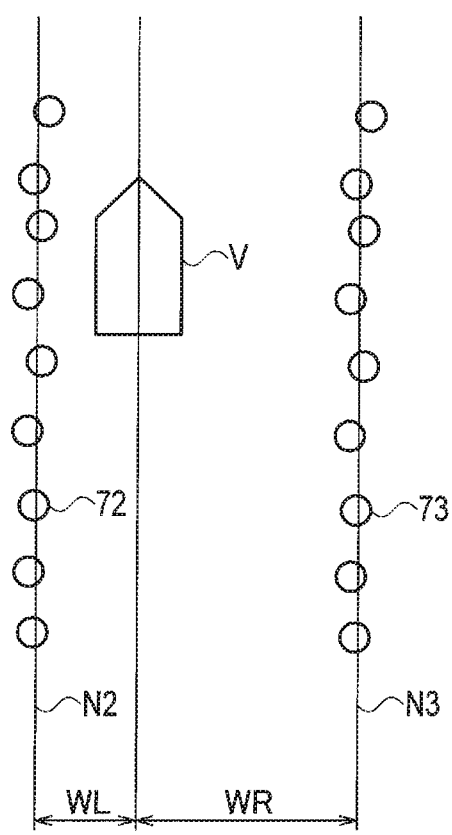
FIG. 9 is the diagram showing straight lines (N2 and N3) approximated to the target position data (72 and 73) indicating the traveling lane boundaries.

For example, the straight line extracting unit 34 approximates straight lines (N2 and N3) with respect to the target position data (72 and 73) indicating the traveling lane boundary shown in FIG. 9. The target position selection unit 35 measures the respective distances in a vehicle width direction from the vehicle V to the respective straight lines (N2 and N3). When the traveling lane width is 4 meters and the vehicle V is traveling in the center of the traveling lane, the respective assumed distances from the center of the vehicle V to the respective white lines are 2 meters. When the absolute value of the difference between the distance from the vehicle V to the straight line (N2, N3) and the assumed distance (2 meters) including a deviation of the position of the vehicle V with respect to the traveling lane, a detection error, and the like is 1 meter or more, it is determined that there is a high possibility that the distance from the vehicle V to the straight line (N2, N3) is inaccurate. In the example shown in FIG. 9, the absolute value of the difference between the distance WL and the estimated distance (2 meters) is the less than 1 meter, but the absolute value of the difference between the distance LR and the estimated distance (2 meters) is equal to or more than 1 meter. Accordingly, the target position selection unit 35 lowly evaluates the reliability of the target position data 73 indicating the right-hand side traveling lane boundary, and highly evaluates the reliability of the target position data 72 indicating the left-hand side traveling lane boundary. The target position selection unit 35 eliminates the target position data 73 of which the reliability is lowly evaluated, and adopts only the target position data 72 of which the reliability is highly evaluated.

The above-mentioned determination method of the reliability based on the difference with the assumed distance is applicable not only to the traveling lane boundaries, e.g. white lines and curbs, but is applicable also to other targets. For example, road structures, e.g. road signs, traffic lights, and utility poles, are present at side strips. Accordingly, the assumed distance can be set on the basis of the traveling lane width, and therefore the difference between the relative distance to the road structure detected from the vehicle V and the assumed distance can be calculated.

The target position selection unit 35 further determines reliability based on the attribute of the target with respect to the target position data 72 selected on the basis of the above-mentioned difference with the assumed distance. More specifically, the target position selection unit 35 determines reliability of the target position data 72 on the basis of the attribute of the target estimated by the target attribute estimation unit 37, and further narrows down the target position data to be used for the self-position estimation.

For example, since a detectable region of the solid line is larger than a detectable region of the dashed line even if both lines are the same white line, it can be determined that the detection accuracy (i.e., reliability) of the relative position is relatively high. By referring to the map information, it is possible to previously specify whether the detected white line is a solid line or a dashed line. When it turned out that the white line positioned at one side of the vehicle V is a solid line and the white line positioned in the other side is a dashed line, it is determined that the reliability of the target position data indicating the white line positioned on the one side is relatively high even if the detection errors of both sides or the respective distances from the vehicle V are approximately the same. Consequently, the target position data indicating the white line positioned in the one side is selected.

The type of the white line is merely an example of the attribute of the targets, and therefore other attributes of the targets can also be applied thereto. For example, regarding a color of the section line, it is easier to detect white lines than the yellow lines, and therefore the reliability of the white lines is highly determined. Moreover, the reliabilities of the different target may be determined from each other. For example, comparing stop lines and the pedestrian crossings with each other, since the number of characteristic parts of the pedestrian crossings is larger than that of the stop lines, the reliability of the pedestrian crossings is highly determined.

The target position selection unit 35 further determines the reliability of the target position data on the basis of a time period when the target position data can be continuously detected, with regard to the target position data selected on the basis of the above-mentioned attribute of the target.

Not only white lines but any targets present in general environments can not always be continuously detected with constant reliability due to aging degradation, occlusion, and other effects. Moreover, in a case of adopting a sensor fusion system for covering different directions by means of a plurality of sensors, it is also considered that a detection of only a certain direction is always uncertain. Therefore, the information on the white line or the traveling lane boundary is evaluated together with the detection time period thereof. Then, only when it is continuously detected for a certain time period (e.g., 10 seconds) or more, it is determined that the reliability thereof is high and this target position data should be selected.

The target position selection unit 35 further determines the reliability of the target position data on the basis of distribution of errors when the target position data of the traveling lane boundary is linearly approximated, with respect to the target position data selected on the basis of the above-mentioned continuous detection time period. In other words, the target position selection unit 35 determines the reliability of the target position data on the basis of the linear information (approximation straight line) extracted by the straight line extracting unit 34, and further narrows down the target position data to be used for the self-position estimation.

Figure 10:
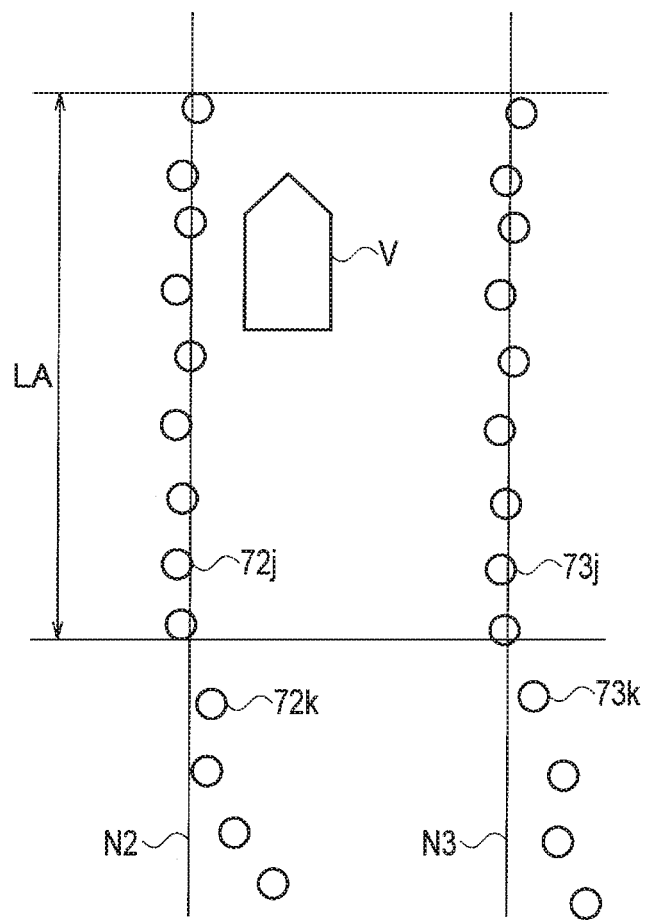
FIG. 10 is a diagram showing an aspect that traveling lane boundaries (72$j$, 72$k$, 73$j$, and 73$k$) which can be linearly approximated are detected, indicating traveling lane boundaries specifying a traveling lane on which the vehicle V is traveling.

The target position selection unit 35 determines whether or not a plurality of parallel traveling lane boundaries are detected as target position data which indicates traveling lane boundaries (e.g., white lines) for specifying a traveling lane on which the vehicle V is traveling. Moreover, when a plurality of the parallel traveling lane boundaries are detected, the reliability of the target position data in a range which can be approximated with the straight line in the detection results of the white lines (target position data) is highly evaluated, and selects the highly-evaluated target position data as target position data to be used for the self-position estimation. For example, as shown in FIG. 10, there are detected the target position data (72*j*, 72*k*, 73*j*, and 73*k*), indicating a plurality of the parallel traveling lane boundaries, which specify a traveling lane on which the vehicle V is traveling. The straight line extracting unit 34 applies a linear approximation to the target position data indicating the traveling lane boundary. The target position selection unit 35 selects the target position data (72*j* and 73*j*) included in the range LA which can be approximated with the straight lines, among the target position data (72*j*, 72*k*, 73*j*, and 73*k*). At this time, the target position selection unit 35 expands the range LA which can be approximated with the straight lines with respect to the vehicle V. For example, a section in which the number of target position data having a minimum distance of the target position data being within a range from −15 cm to +15 cm with respect to the approximate line is equal to or more than 80% is set as the range LA that can be approximated with the straight lines. On the other hand, the target position data (72k and 73k) being not included in the range LA which can be approximated with the straight lines is eliminated.

Figure 11:
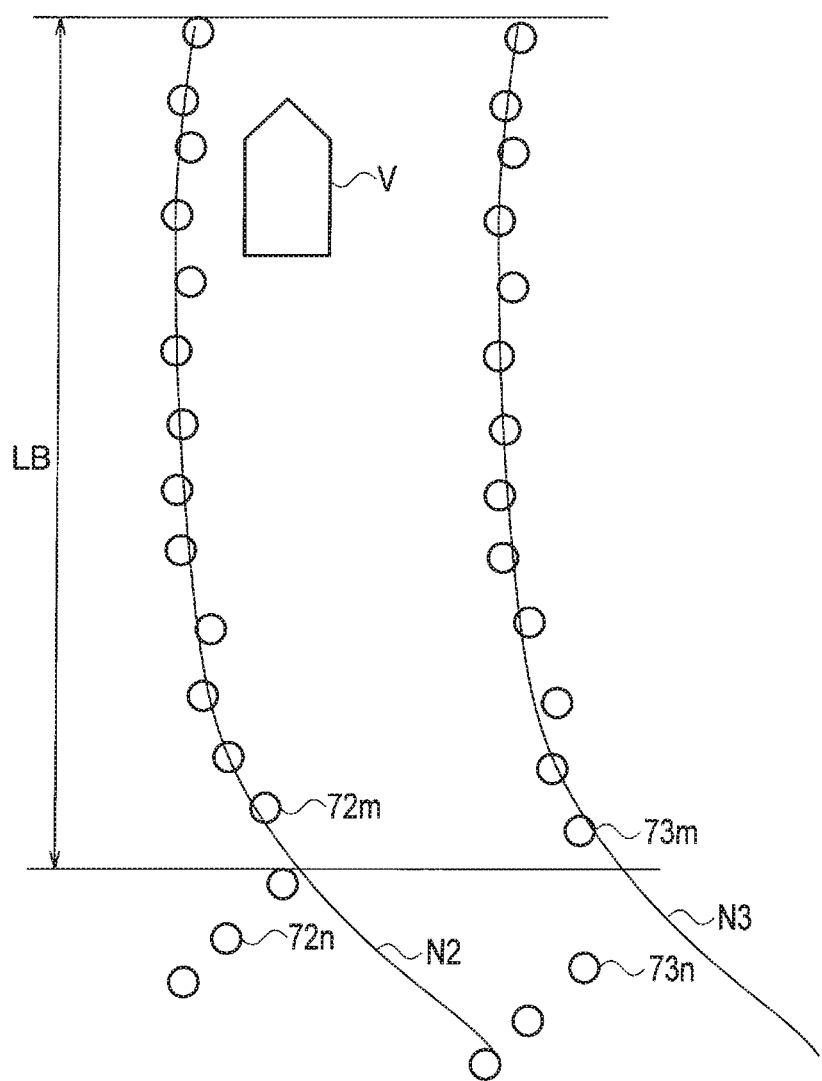
FIG. 11 is a diagram showing an aspect that traveling lane boundaries (72$m$, 72$n$, 73$m$, and 73$n$) which can be curvi-linearly approximated are detected, indicating traveling lane boundaries specifying a traveling lane on which the vehicle V is traveling.

In addition, as shown in FIG. 11, when the traveling lane on which the vehicle V is traveling is a curve section, the approximate line is not always a straight line. In this case, the straight line extracting unit 34 executes a curve approximation instead of the linear approximation (straight line approximation). The target position selection unit 35 highly evaluates the reliability of the target position data (72m and 73m) included in the range LB which can be approximated with the curved lines (N2 and N3), and selects the highly-evaluated target position data as target position data to be used for the self-position estimation. On the other hand, the target position data (72n and 73n) being not included in the range LB which can be approximated with the curved lines is eliminated.

In the present embodiment, there has been shown the example in which the target position selection unit 35 determines the reliability of the relative position of the target position data with respect to the vehicle V in the order of (1) the difference between the distance from the vehicle V to the target and the assumed distance, (2) The attribute of the target, (3) the continuous detection time period, and (4) the distribution of errors when the target position data indicating the traveling lane boundary is linearly approximated. The present invention is not limited to such an example, but the sequence of the determination of reliability can be arbitrarily replaced. Alternatively, only a part of the determination processing among the determination processing (1) to (4) can also be executed. Furthermore, a comprehensive evaluation may be executed by quantifying each reliability determination. For example, in each reliability determination, evaluation points may be given in multiple stages to be added thereto, and thereby a total evaluation point may be calculated. Consequently, the reliability of the detected target can be quantified to be determined.

Next, proceeding to Step S13, the self-position estimation unit 36 compares the target position data selected by the target position selection unit 35 with the position of the target in the map information 41. In other words, the position of the target in the map information 41 and the target position data determined so as to have high reliability by the target position selection unit 35 are matched with each other.

Proceeding to Step S15, the self-position estimation unit 36 estimates a self-position of the vehicle V by executing the above-mentioned comparison (map matching) of the position of the target. More specifically, the self-position estimation unit 36 estimates a position and an attitude angle of total three degrees of freedom composed of a position in the east-west direction of the vehicle V (X coordinate), a position in the north-south direction thereof (Y coordinate), and an azimuth angle (yaw angle $\theta$). A known self-position estimation method may be used as the method of estimating the position on the map. Proceeding to Step S17, the self-position estimation unit 36 outputs the estimated self-position of the vehicle V.

In addition, an Iterative Closest Point (ICP) algorithm can be used for the comparison in Step S13. At this time, with respect to section lines, for example, the self-position estimation unit 36 matches endpoints of both ends thereof as an evaluation point, among the positions of the target included in the map information 41. Moreover, since the target position data is more unaffected by an error of odometry as it is closer to the vehicle V (surrounding sensor group 1), the self-position estimating unit 36 can increase the number of evaluation points for the target in the vicinity of the vehicle V by linearly complementing the target, and can decrease the number of the evaluation points for the target far from the vehicle V.

As mentioned above, according to the embodiments, the following operation/working-effects can be obtained.

Since the target position data are selected on the basis of the reliability of the relative position of target position data with respect to the vehicle V, the target position data estimated so as to have many errors of the relative position can be eliminated, and thereby the estimation accuracy of the self-position is improved.

The target position selecting section 35 determines that the reliability of the relative position of the target position data with respect to the vehicle is higher as the difference between the distance from the vehicle V to the target and the assumed distance is smaller. As a result, since the target position data estimated so as to have a large error in the relative position can be appropriately eliminated, the estimation accuracy of the self-position can be improved.

The target position selection unit 35 determines the reliability of the relative position of the target position data with respect to the vehicle V on the basis of the attribute of the target. For example, comparing the solid line and dashed line of white lines with each other, the target position selection unit 35 determines that the solid line capable of steadily obtaining the target position data is more reliable than the dashed line. Accordingly, since the target position data estimated so as to have many errors in the relative position can be appropriately determined, the estimation accuracy of the self-position can be improved.

The target position selection unit 35 determines the reliability of the relative position of the target position data with respect to the vehicle V on the basis of the time period when the target position data can be continuously detected. As a result, it is possible to stably and accurately estimate the self-position.

The target position selection unit 35 selects target position data having high reliability of the relative position with respect to the vehicle V, when target position data indicating a plurality of parallel traveling lane boundaries, which specify a traveling lane on which the vehicle V travels, is detected. Consequently, the traveling lane boundary having high accuracy of position can be selected, and the accuracy of the self-position estimation becomes higher.

The target position selecting section 35 determines that the reliability of the relative position of the target position data indicating the traveling lane boundary with respect to the vehicle V is higher, as an error from the approximate line when approximating the traveling lane boundary is smaller. Consequently, the traveling lane boundary having high accuracy of the detected position can be selected, and the estimation accuracy of the self-position estimation further becomes higher.

The embodiments of the present invention have been described above, as a disclosure including associated description and drawings to be construed as illustrative, not restrictive. This disclosure makes clear a variety of alternative embodiments, working examples, and operational techniques for those skilled in the art.

The moving object is not limited to the vehicle V as moving objects which move on land, but includes vessels, aircraft, spacecraft, and other moving objects.

The functions described in the respective embodiments may be implemented in one or more processing circuits. Such a processing circuit includes a programmed processing device such as a processing device including an electric circuit. Moreover, the processing device includes an Application Specific Integrated Circuit (ASIC) and/or a device such as a conventional circuit component, configured to execute the functions described in the respective embodiments.

REFERENCE SIGNS LIST

1 Surrounding sensor group (Target detection sensor)
31 Target position detection unit (Target detection sensor)
32 Moved amount estimation unit (Self-position estimation circuit)
33 Target position storing unit (Self-position estimation circuit)
34 Straight line extracting unit (Self-position estimation circuit)
35 Target position selection unit (Self-position estimation circuit)
36 Self-position estimation unit (Self-position estimation circuit)
37 Target attribute estimation unit (Self-position estimation circuit)
41 Map information
61 Curb (Target)
62, 63 White line (Target)
72$j$, 72$k$, 72$m$, 72$n$ Target position data
73$j$, 73$k$, 73$n$, 73$m$ Target position data
M1 to M4 Moved amount of moving object
N1, N2, N3 Line approximating a plurality of target position data
V Vehicle (Moving object)

The invention claimed is:

1. A self-position estimation method using a target detection sensor and a self-position estimation circuit,
   wherein the target detection sensor is mounted in a moving object and is configured to detect relative positions between targets present near the moving object and the moving object,
   wherein the self-position estimation circuit is configured to convert the detected relative positions into adjusted positions of the targets in an odometry coordinate system by adjusting for a moved amount of the moving object and store the converted positions as target position data, and
   wherein the self-position estimation method comprises:
      extracting target position data indicating a travel lane boundary on a basis of a plurality of the stored target position data;
      selecting a plurality of the extracted target position data to be compared with map information on a basis of reliability of the relative position of the extracted target position data with respect to the moving object; and
      comparing the selected target position data with the map information including position information of the target present on a road or near the road, thereby estimating a self-position that is a current position of the moving object.

2. The self-position estimation method according to claim 1, wherein the reliability is determined such that the reliability is higher as a difference between a distance from the moving object to the target obtained from the relative position and an assumed distance from the moving object to the target is smaller.

3. The self-position estimation method according to claim 1, wherein the reliability is determined on a basis of an attribute of the target.

4. The self-position estimation method according to claim 1, wherein the reliability is determined on a basis of a time period when the target position data can be continuously detected.

5. The self-position estimation method according to claim 1, wherein the target position data having high reliability of the relative position with respect to the moving object is selected when target position data indicating a plurality of parallel traveling lane boundaries is detected, the plurality of parallel traveling lane boundaries specifying a traveling lane on which the moving object travels.

6. The self-position estimation method according to claim 5, wherein the reliability is determined such that the reliability of the relative position of the target position data indicating the traveling lane with respect to the moving object is higher, as an error between a line approximating a plurality of the target position data indicating the traveling lane and the plurality of the target position data is smaller.

7. The self-position estimation method according to claim 1, further comprising:
   selecting the target position data that is approximated with straight lines among the detected target position data indicating parallel traveling lane boundaries as the target position data to be compared with the map information.

8. A self-position estimation device comprising:
   a target detection sensor mounted in a moving object, the target detection sensor configured to detect relative positions between targets present near the moving object and the moving object; and
   a self-position estimation circuit configured to convert and adjust the detected relative positions of the targets into an odometry coordinate system by adjusting for a moved amount of the moving object, store the converted relative positions as target position data, extract target position data that indicate a travel lane boundary from the stored target position data using a curve or linear approximation, select a plurality of extracted target position data to be compared with map information on a basis of reliability of the relative position of the extracted target position data with respect to the moving object, and to compare the selected target position data with the map information including the position information of the target present on a road or near the road, thereby estimating a self-position that is a current position of the moving object.

* * * * *